United States Patent [19]

Röhm

[11] 4,213,623

[45] Jul. 22, 1980

[54] NONLOOSENING DRILL CHUCK

[76] Inventor: Günter H. Röhm, Heinrich-Röhm-Str. 50, 7927 Sontheim, Fed. Rep. of Germany

[21] Appl. No.: 11,774

[22] Filed: Feb. 13, 1979

[30] Foreign Application Priority Data

Feb. 17, 1978 [DE] Fed. Rep. of Germany ... 7804747[U]

[51] Int. Cl.² ............................................. B23B 31/14
[52] U.S. Cl. ..................................... 279/1 C; 279/60; 279/64
[58] Field of Search ...................... 279/1 C, 60, 61, 62, 279/1 ME, 63, 64, 65

[56] References Cited

U.S. PATENT DOCUMENTS

| 2,207,621 | 7/1940 | Hite | 279/1 C |
| 3,970,323 | 7/1976 | Schnizler | 279/64 |

FOREIGN PATENT DOCUMENTS

| 496775 | 2/1929 | Austria | 279/60 |
| 7222008 | 6/1972 | Fed. Rep. of Germany | 279/60 |
| 2133142 | 1/1973 | Fed. Rep. of Germany | 279/60 |
| 7524037 | 7/1975 | Fed. Rep. of Germany | 279/60 |
| 2639214 | 3/1978 | Fed. Rep. of Germany | 279/60 |

*Primary Examiner*—William R. Briggs
*Attorney, Agent, or Firm*—Karl F. Ross

[57] ABSTRACT

A chuck has a chuck body defining a chuck axis and carrying three angularly equispaced and radially displaceable jaws. A tightening sleeve is rotatable on this chuck body about the axis thereof and is connected via formations to the jaw and chuck body so that when it is rotated in one rotational sense it displaces the jaws radially inwardly and when rotated in the opposite rotational sense it allows outward displacement of these jaws. An axially centered array of ratchet teeth is formed on the sleeve and a ratchet is pivoted on the chuck body and has an end engageable with the ratchet teeth so that when engaged the sleeve can only rotate in the one rotational sense for tightening of the jaws relative to the chuck body. A radially outwardly displaceable counterweight is carried on this ratchet to urge it into engagement with the teeth when the chuck is rotated, but the ratchet can be manually moved out of engagement with the teeth to allow manual loosening of the chuck.

10 Claims, 2 Drawing Figures

NONLOOSENING DRILL CHUCK

FIELD OF THE INVENTION

The present invention relates to a drill chuck. More particularly this invention concerns such a chuck of the self-tightening type.

BACKGROUND OF THE INVENTION

A chuck is normally used to hold a rotary tool and can also be used to hold a workpiece in some situations. A standard drill chuck has a chuck body on which a plurality, normally three, of angularly equispaced jaws are displaceable for clamping the tool or workpiece. It is standard practice to provide a tightening sleeve on the chuck body which when rotated in one rotational sense moves the jaws radially toward each other and when rotated in the opposite sense allows them to move radially apart.

It is possible to mount the jaws on the tightening sleeve and to set the tightening rotation direction of the sleeve opposite the rotation direction of the chuck, so that when the rotation of the tool held by the chuck is resisted this force is transformed into a force tending to tighten the jaws on the tool. Such an arrangement can be seen in German Utility Models 7,222,008 and 7,524,037 as well as in German Patent Publications 2,133,142 and 2,639,214. These self-tightening chucks are extremely advantageous in that they do not require a separate tightening key to ensure that the workpiece will be firmly held, but can easily be tightened on and loosened from a tool by hand.

A considerable disadvantage of such a chuck is that when used in a hammer drill, where is it axially reciprocated as well as rotated, and wherein in some situations it is not rotated at all but is only reciprocated, the chuck loosens. It is therefore necessary in this application to retighten the chuck frequently.

OBJECTS OF THE INVENTION

It is therefore and object of the present invention to provide an improved chuck.

Another object is to provide a chuck of the above-described type which does not loosen, even when subject to vibration as in a hammer drill or the like.

SUMMARY OF THE INVENTION

These objects are attained according to the invention in a chuck of the above-described general type having a chuck body defining a chuck axis, a plurality of generally angularly equispaced and radially displaceable jaws on the chuck body, a tightening body rotatable on the chuck body about the axis thereof, and means including formations on the jaws and on the bodies for displacing the jaws radially inwardly on rotation of the tightening body on the chuck body in one rotational sense and for permitting radial outward displacement of the jaws on rotation in the other opposite sense. According to this invention an axially centered array of ratchet teeth, normally of sawtooth construction, is provided on one of the bodies. A ratchet is provided on the other of the bodies and is radially engageable with the ratchet teeth so as to permit rotation of the tightening body on the chuck body in the one tightening sense when engaged and to prevent rotation in the opposite sense when engaged. Means is provided including a radially displaceable counterweight connected to this ratchet for urging same into engagement with the ratchet teeth on rotation of the bodies about the chuck axis. Thus according to this invention the tightening body can only rotate in the tightening direction when the ratchet is engaged with the ratchet teeth, thereby preventing loosening of a chuck thus equipped.

According to further features of this invention the ratchet is a pawl pivotal about a ratchet axis generally parallel to the chuck axis and having one arm to one angular side of the ratchet axis and carrying the counterweight and another arm to the other side of the ratchet axis and having an end engageable with the ratchet teeth. This one arm is curved generally on a center at the chuck axis and at least in part itself constitutes the counterweight. A spring is provided biasing this one arm radially outwardly so that even when the chuck is not rotating at sufficient speed to centrifugally force the end of the pawl into engagement with the ratchet teeth the ratchet action is ensured.

The pawl according to this invention is pivoted on the chuck body and the ratchet teeth are provided on the tightening body, here constituted as a sleeve surrounding the chuck body. To this end the chuck body includes a ring forming an annular space containing the pawl. The pawl is provided with a radially outwardly extending button projecting through a side wall of this ring and accessible from outside. Thus the user need merely depress this button, extending from the one arm of the pawl, to move the other arm out of engagement with the teeth and allow loosening of the chuck.

SPECIFIC DESCRIPTION

Figure 1:
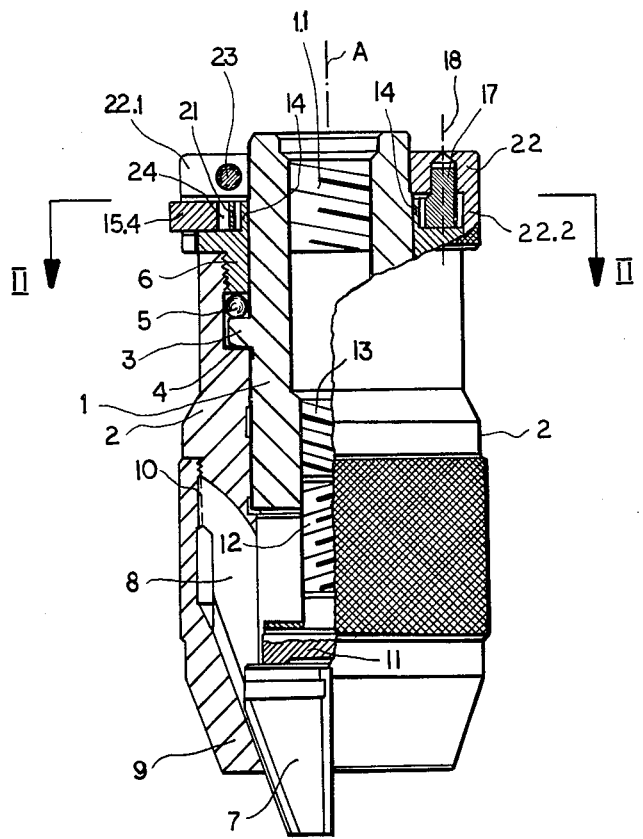
FIG. 1 is a side partly section view of the chuck according to this invention.

A chuck according to the instant invention as shown in FIG. 1 basically comprises a chuck body 1 centered on an axis A and formed with a forwardly open threaded bore 13 and with a rearwardly open threaded bore 1.1, the latter adapted to be connected to the threaded driving spindle of a hammer drill or the like. A tightening sleeve 2 is rotatable on this body 1 about the axis A. An outwardly radially projecting square-section ridge 3 on the body 1 is received between a shoulder 4 of the sleeve 2 and balls 5 themselves riding on an L-section ring 6 threaded into the upper end of the sleeve 2.

The sleeve 2 is formed with three angularly equispaced guides 8 that are laterally closed by a tightening collar 9 secured by means of screw threads 10 to the sleeve 2. Each of these guides 8 receives a respective jaw 7 having a rear end bearing on an abutment 11 formed on a threaded spindle 12 received in the forwardly open threaded bore 13. The abutment 11 is rotationally coupled to the jaws 7 which in turn are rotationally coupled by means of the guides 8 to the sleeve 2. Thus rotation of the sleeve 2 in one direction will screw the spindle 12 within the bore 13 and axially advance the jaws 7, which ride on the frustoconical inner surface of the collar 9. Screwing in the opposite direction will retract the jaws 7 axially and radially. Since the inner surface of the tightening sleeve 9 is frustoconical this axial displacement will have a radial component for clamping a tool or workpiece between the jaws 7.

The body 1 is formed at its upper end with an upwardly projecting cylindrical rim 14 formed with a multiplicity of sawteeth 14.1 each having a shallow flank 19 and a steep flank 20. A ratchet 15 pivoted about a pin 17 extending parallel to the axis A has an end 15.1 which can engage between the teeth 14.1 and another arm 15.2 which is curved about a center substantially at the axis A and which is urged by means of a leaf spring 21 away from the rim 14 having the teeth 14.1.

The pivot 17 defines an axis 18 parallel to the axis A and is journaled in a ring 22 formed with a split 22.1 and clamped on the upper portion of the body 1 by means of a screw 23. This ring 22 has a side wall 22.2 forming an annular space or chamber 24 receiving the pawl 15.

More particularly the arm 15.2 of this pawl 15 is urged radially outwardly by the leaf spring 21 whose two ends bear radially outwardly on the arm 15.2 while its center bears radially inwardly on the collar or rim 14 having the teeth 14.1. The arm 15.2 engaging the spring 21 is substantially heavier than the arm 15.3 formed with the tooth-engaging tip 15.1. In addition the arm 15.2 is formed with a button 15.4 extending out of the chamber 24 through a radially open hole 25.

Figure 2:
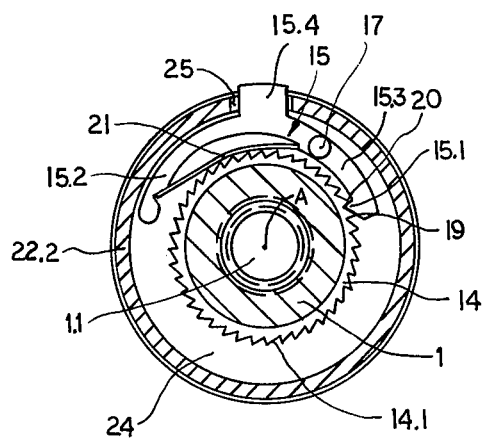
FIG. 2 is a section taken along line II—II of FIG. 1.

According to the instant the sleeve 2 is rotated clockwise as seen in FIG. 2 to screw the spindle 12 axially downwardly in the hole 13 so as to force the jaws 7 together. In this direction of rotation the click tip 15.1 of the pawl 15 will be cammed outwardly by the shallow flanks 19 of the teeth 14.1 so that this ratchet mechanism will not prevent rotation of the sleeve 2 relative to the body 1 in the clockwise or tightening direction.

Rotation of the sleeve 2 in the opposite direction, however, will be impeded by engagement of the tip 15.1 by the steep flanks 20 which lie in planes including the axis A. Only if the button 15.4 is depressed to pivot the pawl 15 about the axis 18 can the tip 15.1 disengaged from the teeth 14.1 for rotation of the sleeve 2 in the counterclockwise loosening direction of FIG. 2.

During normal use the entire chuck is rotated at high speed about axis A. This high-speed rotation will urge the arm 15.2 contrifugally outwardly so that the end 15.1 will be forced into good contact with the teeth 14.1. Thus centrifugal force will not render the ratchet mechanism ineffective.

I claim:

1. A chuck comprising:
   a chuck body defining a chuck axis;
   a plurality of generally angularly equispaced and radially displaceable jaws on said body;
   a tightening body rotatable on said chuck body about said axis;
   means including formations on said jaws on on said bodies for displacing said jaws radially inwardly on rotation of said tightening body on said chuck body in one rotational sense and for permitting radial outward displacement of said jaws on rotation in the other opposite sense;
   an axially centered array of ratchet teeth on one of said bodies;
   a ratchet on the other of said bodies radially engageable with said ratchet teeth, said ratchet teeth and ratchet being so constructed as to permit rotation of said tightening body on said chuck body in said one sense when engaged and to prevent rotation in the opposite sense when engaged; and
   means including a radially displaceable counterweight connected to said ratchet for urging same into engagement with said ratchet teeth on rotation of said bodies about said axis.

2. The chuck defined in claim 1 wherein said ratchet is a ratchet pawl pivoted on said other body about a ratchet axis generally parallel to said chuck axis.

3. The chuck defined in claim 1 wherein said ratchet pawl has one arm to one angular side of said ratchet axis and carrying said counterweight and another arm to the other side of said ratchet axis and having an end engageable with said ratchet teeth.

4. The chuck defined in claim 3 wherein said one arm is curved generally on a center at said chuck axis.

5. The chuck defined in claim 3, further comprising spring means biasing said one arm radially outwardly.

6. The chuck defined in claim 3 wherein said one arm is substantially longer and heavier than said other arm at least in part itself constitutes said counterweight.

7. The chuck defined in claim 3 wherein said one arm is provided with an externally accessible button depressible to displace said one end out of engagement with said ratchet teeth.

8. The chuck defined in claim 3 wherein said ratchet teeth are sawteeth.

9. The chuck defined in claim 3 wherein said chuck body is said other body and is provided with a ring forming an annular space surrounding said tightening body and housing said pawl.

10. The chuck defined in claim 9 wherein said one arm is provided with an externally accessible button extending outwardly from said space and depressible to displace said one end out of engagement with said ratchet teeth.

* * * * *